(12) United States Patent
Sejimo

(10) Patent No.: US 11,565,418 B2
(45) Date of Patent: Jan. 31, 2023

(54) ROBOT SYSTEM

(71) Applicant: Seiko Epson Corporation, Tokyo (JP)

(72) Inventor: Isamu Sejimo, Azumino (JP)

(73) Assignee: SEIKO EPSON CORPORATION

( * ) Notice: Subject to any disclaimer, the term of this patent is extended or adjusted under 35 U.S.C. 154(b) by 240 days.

(21) Appl. No.: 16/879,974

(22) Filed: May 21, 2020

(65) Prior Publication Data

US 2020/0368909 A1    Nov. 26, 2020

(30) Foreign Application Priority Data

May 22, 2019    (JP) .............................. JP2019-095791

(51) Int. Cl.
*B25J 9/16*    (2006.01)
*B25J 13/08*    (2006.01)

(52) U.S. Cl.
CPC ........... *B25J 9/1676* (2013.01); *B25J 9/1669* (2013.01); *B25J 13/085* (2013.01)

(58) Field of Classification Search
CPC ........ B25J 13/085; B25J 13/088; B25J 18/00; B25J 19/06; B25J 9/0081; B25J 9/1669; B25J 9/1676; G05B 2219/40202; G05B 2219/40317
USPC ....................................................... 700/245
See application file for complete search history.

(56) References Cited

U.S. PATENT DOCUMENTS

| 10,769,465 | B2 * | 9/2020 | Zhang ..................... G06V 40/63 |
| 2007/0096674 | A1 * | 5/2007 | Hashimoto ............ B25J 9/1674 318/568.13 |
| 2007/0150106 | A1 * | 6/2007 | Hashimoto ............ G06N 3/004 700/245 |
| 2007/0233321 | A1 * | 10/2007 | Suzuki ................. G05D 1/0251 700/245 |
| 2008/0052761 | A1 * | 2/2008 | Minami ................ G06F 21/608 726/2 |
| 2013/0051632 | A1 * | 2/2013 | Tsai ........................ G06V 40/70 382/118 |
| 2015/0158178 | A1 * | 6/2015 | Burmeister ........... G06T 1/0014 382/203 |
| 2015/0352719 | A1 | 12/2015 | Nakazato et al. |
| 2016/0271794 | A1 * | 9/2016 | Inaba ..................... B25J 9/1602 |
| 2017/0157783 | A1 * | 6/2017 | Ogawa .................... F16P 3/003 |

(Continued)

FOREIGN PATENT DOCUMENTS

| CN | 107150342 A | * | 9/2017 | ............... B25J 19/06 |
| DE | 102005003827 A1 | * | 7/2006 | ............ B25J 9/1676 |

(Continued)

OTHER PUBLICATIONS

DE102005003827A1.FOR.English.Translate (Year: 2006).*
DE102016007519A1.FOR.English.Translate (Year: 2017).*
JP2017061026A.FOR.English.Translate (Year: 2017).*

*Primary Examiner* — B M M Hannan
(74) *Attorney, Agent, or Firm* — Harness, Dickey & Pierce, P.L.C.

(57) ABSTRACT

A robot system includes a robot configured to operate in cooperation with a person, a specifying section configured to specify a person present in a region at a predetermined distance from the robot, and a control section configured to decelerate or stop the operation of the robot when the presence of the person in the region is specified by the specifying section. The control section changes the distance based on a result of specifying the person by the specifying section.

7 Claims, 13 Drawing Sheets

(56) References Cited

U.S. PATENT DOCUMENTS

| | | | |
|---|---|---|---|
| 2017/0326734 A1* | 11/2017 | Iida | B25J 9/1674 |
| 2018/0071914 A1* | 3/2018 | Heidemann | F16P 3/142 |
| 2018/0120804 A1* | 5/2018 | Higuchi | B25J 19/06 |
| 2018/0222050 A1* | 8/2018 | Vu | G01S 7/4808 |
| 2018/0232593 A1* | 8/2018 | Tani | G06V 10/22 |
| 2019/0099902 A1* | 4/2019 | Yamamoto | F16P 3/14 |
| 2019/0105779 A1* | 4/2019 | Einav | B25J 9/1689 |
| 2019/0160668 A1* | 5/2019 | Oyama | B25J 13/084 |
| 2019/0351554 A1* | 11/2019 | Onose | F16P 3/142 |
| 2021/0129336 A1* | 5/2021 | Fakher | B25J 19/06 |

FOREIGN PATENT DOCUMENTS

| | | | | |
|---|---|---|---|---|
| DE | 102016007519 A1 * | 12/2017 | | B25J 9/1676 |
| JP | 2004243427 A * | 9/2004 | | |
| JP | 2005103690 A * | 4/2005 | | |
| JP | 2010-257451 A | 11/2010 | | |
| JP | 2015-230621 A | 12/2015 | | |
| JP | 2015230621 A5 * | 12/2015 | | B25J 13/08 |
| JP | 2016012257 A * | 1/2016 | | |
| JP | 2017061026 A * | 3/2017 | | |
| JP | 2017205858 A * | 11/2017 | | B25J 13/085 |
| JP | 2018012159 A * | 1/2018 | | |
| JP | 2020011357 A * | 1/2020 | | B25J 13/00 |
| WO | WO-2004052597 A1 * | 6/2004 | | G06T 7/0042 |

* cited by examiner

ROBOT SYSTEM

The present application is based on, and claims priority from JP Application Serial Number 2019-095791, filed May 22, 2019, the disclosure of which is hereby incorporated by reference herein in its entirety.

BACKGROUND

1. Technical Field

The present disclosure relates to a robot system.

2. Related Art

A collaborative robot is a robot that shares the same work space with a person and performs work in cooperation with the person.

For example, JP A-2015-230621 (Patent Literature 1) discloses an information processing device including first holding means for holding personal information, second holding means for holding work process information, measuring means for acquiring measurement data for recognizing an individual, recognizing means for recognizing the individual based on the measurement data and the personal information, managing means for managing work information including the personal information of the recognized individual and the work process information corresponding to the individual, and control means for controlling a robot based on the work information.

In the information processing device disclosed in Patent Literature 1, the recognizing means for recognizing an individual detects a person based on the measurement data. When the measurement data does not match the individual information, the recognizing means recognizes the person as an unidentified person. When the unidentified person is recognized, driving speed of the robot is reduced or driving of the robot is stopped.

However, in the information processing device disclosed in Patent Literature 1, the driving of the robot is limited when the unidentified person is simply recognized. Accordingly, when the robot is set in an environment in which an unspecified large number of people come and go, the driving is frequently limited and productivity of work by the robot is deteriorated.

SUMMARY

A robot system according to an application example of the present disclosure includes: a robot configured to operate in cooperation with a person; a specifying section configured to specify a person present in a region at a predetermined distance from the robot; and a control section configured to decelerate or stop the operation of the robot when the presence of the person in the region is specified by the specifying section. The control section changes the distance based on a result of specifying the person by the specifying section.

DESCRIPTION OF EXEMPLARY EMBODIMENTS

Preferred embodiments of the present disclosure are explained in detail below with reference to the accompanying drawings.

1. First Embodiment

First, a robot system according to a first embodiment is explained.

Figure 1:
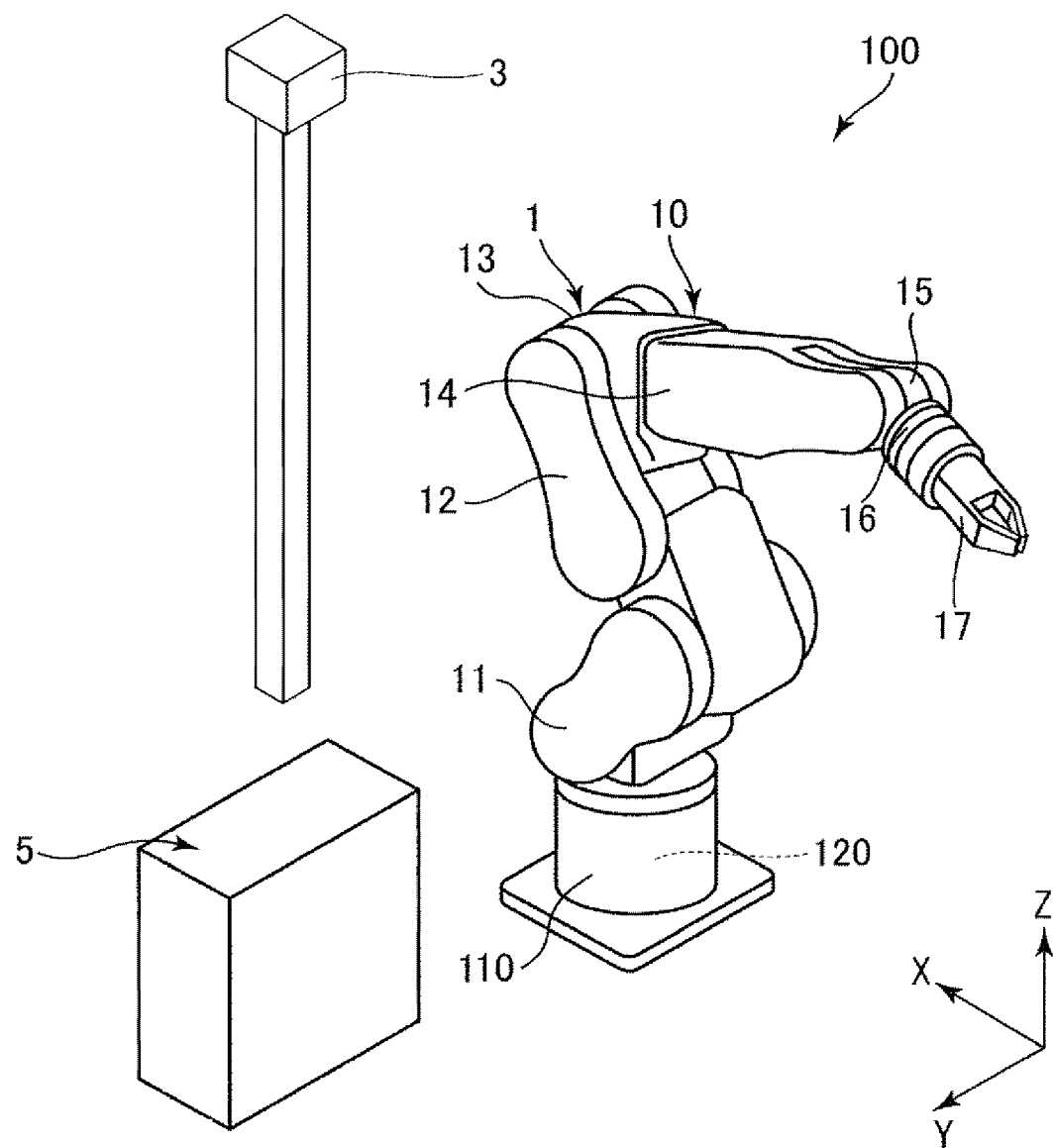
FIG. 1 is a diagram showing a robot system according to a first embodiment.
Figure 2:
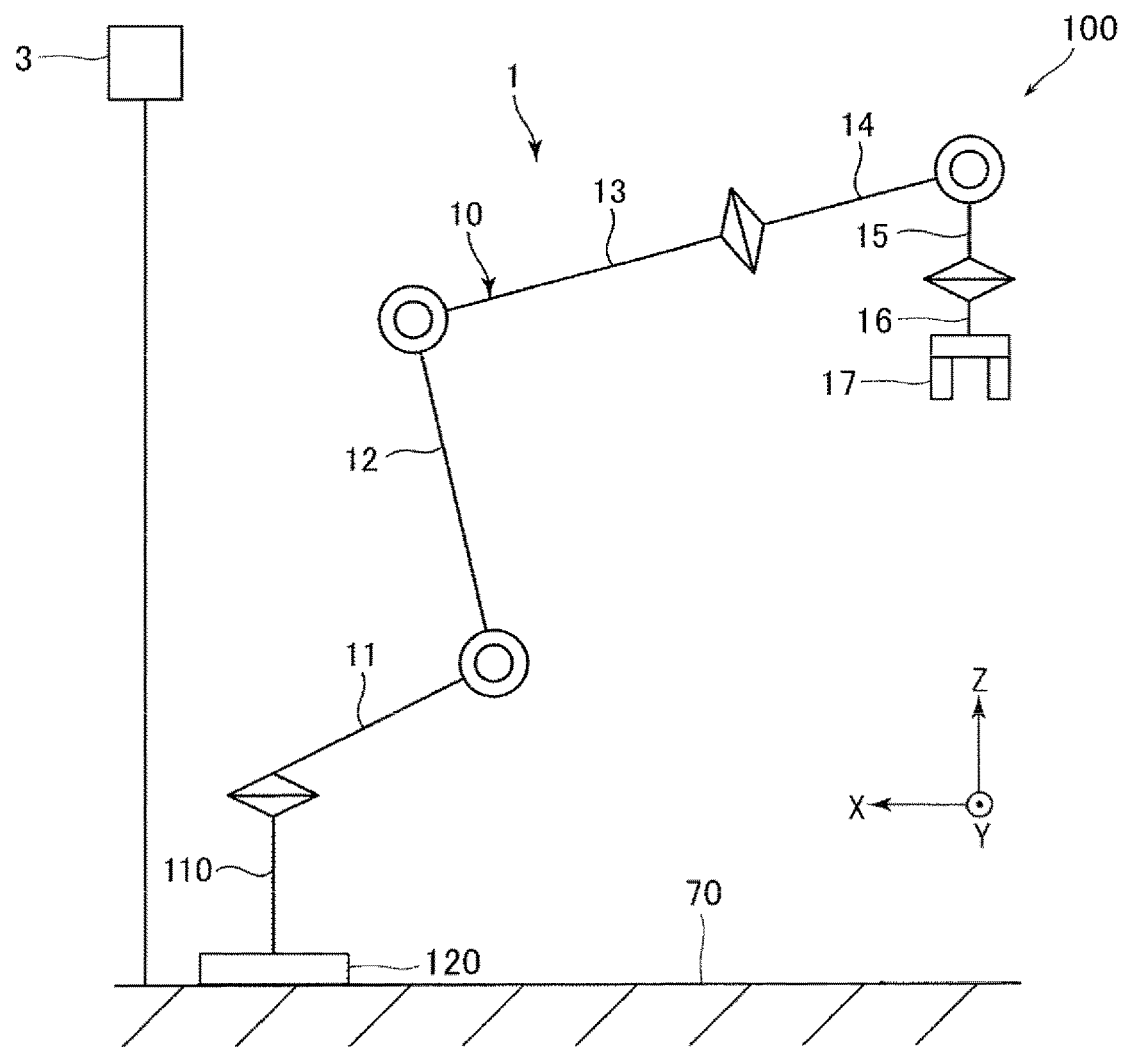
FIG. 2 is a schematic diagram of the robot system shown in FIG. 1.
Figure 3:
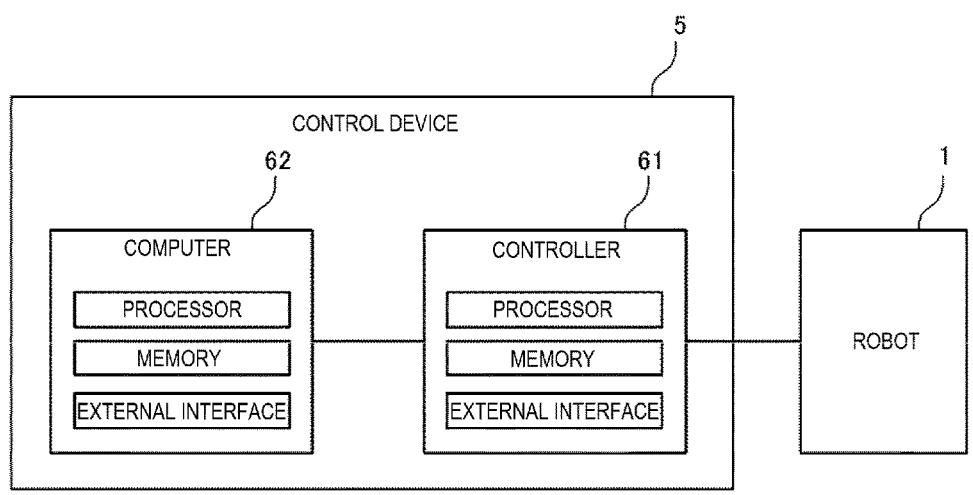
FIG. 3 is a block diagram showing an example of a hardware configuration of the robot system shown in FIGS. 1 and 2.
Figure 4:
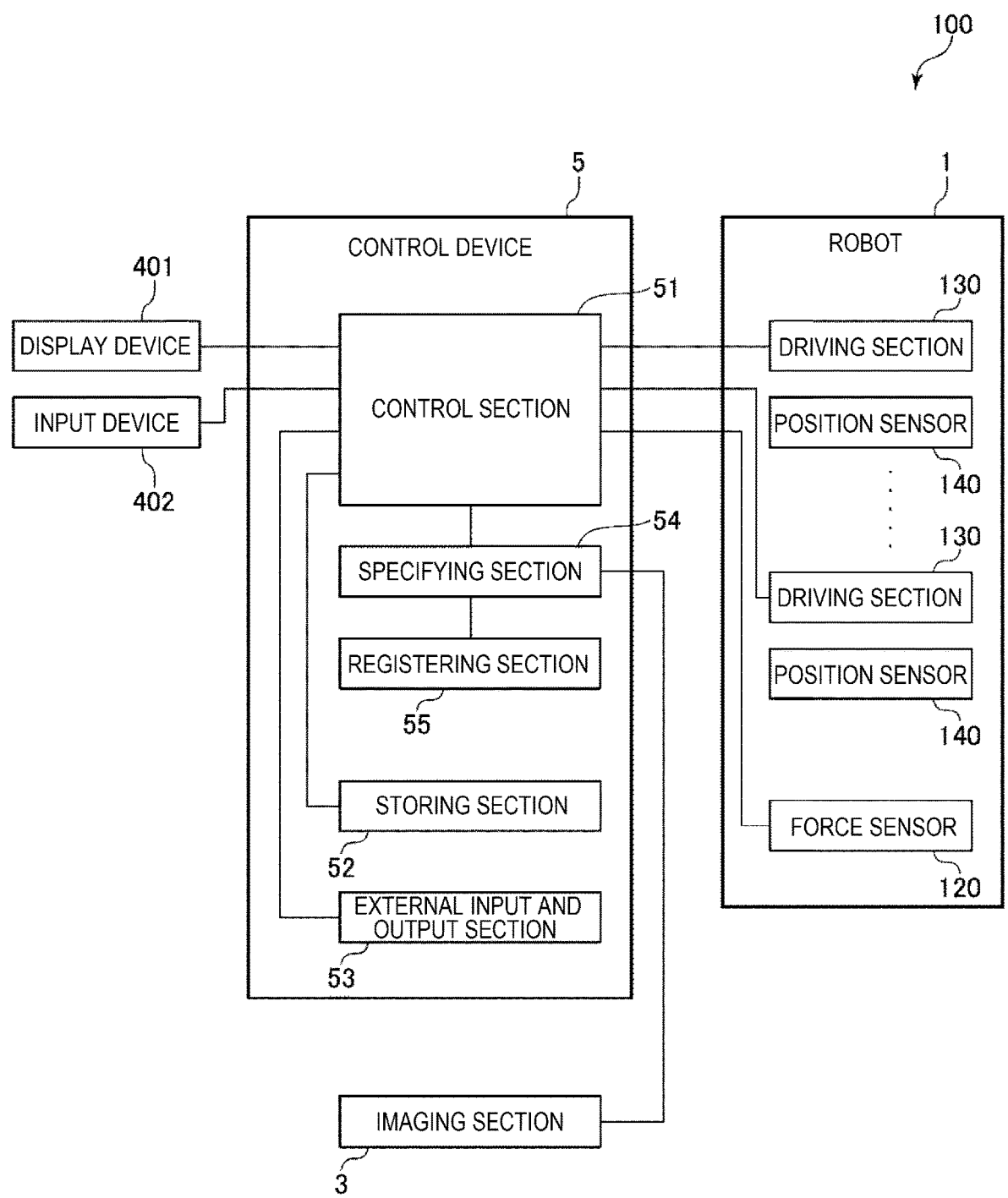
FIG. 4 is a functional block diagram for explaining FIG. 3 more in detail.

FIG. 1 is a diagram showing the robot system according to the first embodiment. FIG. 2 is a schematic diagram of the robot system shown in FIG. 1. FIG. 3 is a block diagram showing an example of a hardware configuration of the robot system shown in FIGS. 1 and 2. FIG. 4 is a functional block diagram for explaining FIG. 3 more in detail.

In FIG. 1, an X axis, a Y axis, and a Z axis are shown as three axes orthogonal to one another. In this specification, "coupled" includes both of "directly coupled" and "indirectly coupled via any member".

1.1 Robot System

A robot system 100 shown in FIG. 1 is used in work such as holding, conveyance, and assembly of a work target object. The robot system 100 includes a robot 1, a control device 5 that controls driving of the robot 1, a force sensor 120 that detects force acting on the robot 1, and an imaging section 3 that images the periphery of the robot 1. These sections are communicable by wire or radio. The communication among the sections may be performed via a network such as the Internet.

1.1.1 Robot

As shown in FIGS. 1 and 2, the robot 1 is a so-called six-axis vertical articulated robot and includes a base 110 and a robot arm 10 coupled to the base 110.

The base 110 is a portion for attaching the robot 1 to any setting place. In this embodiment, the base 110 is set on, for example, a setting place 70 formed by an X-Y plane shown in FIG. 2. The setting place 70 of the base 110 is not limited to a floor or the like and may be, for example, a wall, a ceiling, or a movable truck. The force sensor 120 is disposed between the robot 1 and the setting place 70 to make it possible to detect force acting on the robot 1.

As shown in FIGS. 1 and 2, the robot arm 10 includes an arm 11, an arm 12, an arm 13, an arm 14, an arm 15, and an arm 16. These arms 11 to 16 are coupled in this order from the proximal end side, that is, the base 110 side to the distal end side, that is, the opposite side of the base 110. The arms 11 to 16 are capable of turning with respect to the arms adjacent thereto or the base 110. For example, the arm 16 is formed in a disk shape as shown in FIG. 1 and is capable of turning with respect to the arm 15.

As shown in FIG. 1, a gripping hand 17 that grips a work target object is coupled to the distal end of the robot arm 10. The gripping hand 17 is replaceable. A suction hand, a magnetic hand, a screwing tool, an engaging tool, or the like may be used instead of the gripping hand 17.

As shown in FIG. 4, the robot 1 includes a driving section 130 including a not-shown motor that turns one arm with respect to the other arm or the base 110 and a not-shown speed reducer. As the motor, for example, a servomotor such as an AC servomotor or a DC servomotor can be used. As the speed reducer, for example, a planetary gear-type speed reducer or a wave motion gear device can be used. The robot 1 includes a position sensor 140 that detects a rotation angle of a rotation axis of the motor or the speed reducer. For example, a rotary encoder can be used as the position sensor 140. The driving section 130 and the position sensor 140 are provided in each of the base 110 and the arms 11 to 16. In this embodiment, the robot 1 includes six driving sections 130 and six position sensors 140. The driving sections 130 are electrically coupled to the control device 5 via, for example, not-shown motor drivers incorporated in the robot 1. Further, although not shown in FIG. 4, the position sensors 140 are also electrically coupled to the control device 5.

Besides, any members, equipment, and the like may be provided in the robot 1.

1.1.2 Control Device

As shown in FIG. 4, the control device 5 has a function of controlling driving of the robot 1 and is communicably coupled to the robot 1. The control device 5 and the robot 1 may be coupled by wire or may be coupled by radio. A display device 401 (a display section) including a monitor and an input device 402 including a keyboard or a touch panel are coupled to the control device 5.

As shown in FIG. 4, the control device 5 includes a control section 51, a storing section 52, an external input and output section 53, a specifying section 54 that specifies a person present around the robot 1, and a registering section that registers personal information of persons. The components of the control device 5 are communicably coupled to one another via various buses.

The control section 51 executes various programs and the like stored in the storing section 52. Consequently, it is possible to realize control of driving of the robot 1 and processing such as various arithmetic operations and determination. When the presence of a person within a range of a predetermined distance from the robot 1 is detected by the specifying section 54, the control section 51 according to this embodiment decelerates or stops the operation of the robot 1. Decelerating the operation of the robot 1 means reducing driving speed of the robot arm 10 and the gripping hand 17. Consequently, it is possible to prevent the robot 1 from colliding with a person or an object and, even if the robot 1 collides with a person or an object, reduce a shock. The control section 51 also has a function of decelerating or stopping the operation of the robot 1 in response to the output from the force sensor 120. Consequently, even if the robot 1 collides with a person or an object, it is possible to reduce a shock.

Various programs executable by the control section 51 are stored in the storing section 52. Various data received by the external input and output section 53 can be stored in the storing section 52.

The external input and output section 53 includes an external interface and is used for coupling to the robot 1, the display device 401, and the input device 402.

The specifying section 54 specifies a person present within the range of the predetermined distance from the robot 1. Specifying a person means recognizing the person and measuring the position of the person. A method of specifying a person with the specifying section 54 is not particularly limited. However, in this embodiment, an imaging result by the imaging section 3 can be used. Specifically, the specifying section 54 applies image processing to the imaging result, extracts a contour of an object, and detects, for example, with template matching, whether the object is a person. Besides the method of using the imaging result of the imaging section 3, there are, for example, a method of using a distance sensor, a method of measuring a temperature distribution, a method of using a recording result of sound, and a method of detecting characteristics of a movement.

A specifying result by the specifying section 54, that is, information indicating whether a person is present within the range of the predetermined distance from the robot 1 and, if a person is present, information concerning the position of the person are output to the control section 51.

The control section 51 uses, as a condition for decelerating or stopping the operation of the robot 1 and limiting driving to decelerate or stop the operation of the robot 1 as explained above based on the result of specifying the person by the specifying section 54, information indicating whether a person is specified within the range of the predetermined distance from the robot 1. In other words, when the specifying section 54 specifies that the person is present within the range of the predetermined distance from the robot 1, the control section 51 limits the driving of the robot 1 based on the specifying result. In this way, the control section 51 specifies, based on the distance from the robot 1, a range in which the robot 1 is likely to collide with the person.

The control section 51 has a function of changing the distance based on the result of specifying the person by the specifying section 54. Consequently, it is possible to vary, according to the result of specifying the person, a distance to which a person performing work or the like near the robot 1 can approach the robot 1. As a result, the person is allowed to perform work in a position closer to the robot 1 according to proficiency in work, presence or absence of a qualification, or the like different for each person. Therefore, it is possible to improve efficiency of the work. As a result, it is possible to improve productivity of work by the robot 1 while maintaining safety according to control for limiting driving of the robot 1 when the presence of the person within the range of the predetermined distance is specified.

The registering section 55 registers personal information of persons. Examples of the personal information include identification information for identifying individuals and attribute information indicating attributes of the individuals. Examples of the identification information include a name, an identification number, a face image, height, voice, a way of movement, and a dominant hand. Examples of the attribute information include proficiency in work, a qualification, a work history, and a work operation track.

A hardware configuration of the control device 5 for realizing such functions of the sections is not particularly limited. However, the control device 5 includes a controller 61 communicably coupled to the robot 1 and a computer 62 communicably coupled to the controller 61.

Examples of a processor of the computer 62 shown in FIG. 3 include a CPU (Central Processing Unit), an FPGA (Field-Programmable Gate Array), and an ASIC (Application Specific Integrated Circuit).

Examples of a memory of the computer 62 shown in FIG. 3 include a volatile memory such as a RAM (Random Access Memory) and a nonvolatile memory such as a ROM (Read Only Memory). The memory is not limited to a nondetachable type and may include a detachable external storage device.

Further, examples of an external interface of the computer 62 shown in FIG. 3 include various connectors for communication. Examples of the connectors for communication include a USB (Universal Serial Bus) connector, an RS-232C connector, a wired LAN (Local Area Network), and a wireless LAN.

At least two of the control section 51, the specifying section 54, and the registering section 55 may be aggregated into one element in the hardware configuration.

Other components may be further added to the control device 5 in addition to the components explained above. The various programs, the data, and the like stored in the storing section 52 may be stored in the storing section 52 in advance, may be stored in a recording medium such as a CD-ROM and provided from the storage medium, or may be provided via a network or the like.

1.1.3 Force Sensor

The force sensor 120 shown in FIG. 1 is provided on the inside of the base 110 of the robot 1. Consequently, it is possible to detect force acting on the gripping hand 17 and the robot arm 10.

As such a force sensor 120, a force sensor such as a six-axis force sensor or a three-axis force sensor is preferably used. The force sensor can accurately detect force. The force sensor can also detect the magnitude and the direction of the force. Therefore, for example, it is possible to grasp in which direction the force is acting on the gripping hand 17 and the robot arm 10. The force sensor 120 converts the detected force into an electric signal and outputs the electric signal to the control device 5.

The control section 51 included in the control device 5 decelerates or stops the operation of the robot 1 based on the output from the force sensor 120. Consequently, even when the gripping hand 17 or the robot arm 10 collides with an obstacle or the like, it is possible to minimize a shock.

1.1.4 Imaging Section

The imaging section 3 shown in FIGS. 1 and 2 is located on the setting place 70 and is set to be able to image the periphery of the robot 1.

Although not shown in FIGS. 1 and 2, the imaging section 3 includes an imaging element configured by a CCD (Charge Coupled Device) image sensor including a plurality of pixels and an optical system including a lens. The imaging section 3 focuses, with the lens, light from an imaging target or the like on a light receiving surface of the imaging element, converts the light into an electric signal, and outputs the electric signal to the control device 5. The imaging section 3 is not limited to the configuration explained above and may have another configuration if the imaging section 3 has an imaging function.

The position of the imaging section 3 is not limited to the position shown in FIGS. 1 and 2. For example, the imaging section 3 may be set on a ceiling or a wall of a room in which the robot 1 is set. Depending on the position of the imaging section 3, it is difficult to photograph a face of a person. In that case, the person may wear a helmet and an identification mark, for example, a two-dimensional barcode may be stuck to the upper surface of the helmet.

The imaging section 3 only has to be provided according to necessity and may be substituted by other equipment capable of detecting a person. Examples of the equipment capable of detecting a person include, when the person holds a device that transmits light, an infrared ray, a radio wave, or ultrasound, equipment that can calculate a direction in which the radio wave or the like is transmitted and a distance to the device.

1.1.5 Display Device and Input Device

The display device 401 shown in FIG. 4 includes a monitor and has a function of displaying various screens and the like. Therefore, an operator can confirm a driving state and the like of the robot 1 via the display device 401.

The input device 402 includes a keyboard. Therefore, the operator can give instructions for various kinds of processing to the control device 5 by operating the input device 402. Although not shown in FIG. 4, the input device 402 may include a teaching pendant.

A display input device including both of the functions of the display device 401 and the input device 402 may be used instead of the display device 401 and the input device 402. As the display input device, for example, a touch panel display can be used. The robot system 100 may include one display device 401 and one input device 402 or may include a plurality of display devices 401 and a plurality of input devices 402.

1.2 Control Method for the Robot

A control method for the robot according to the first embodiment is explained.

Figure 5:
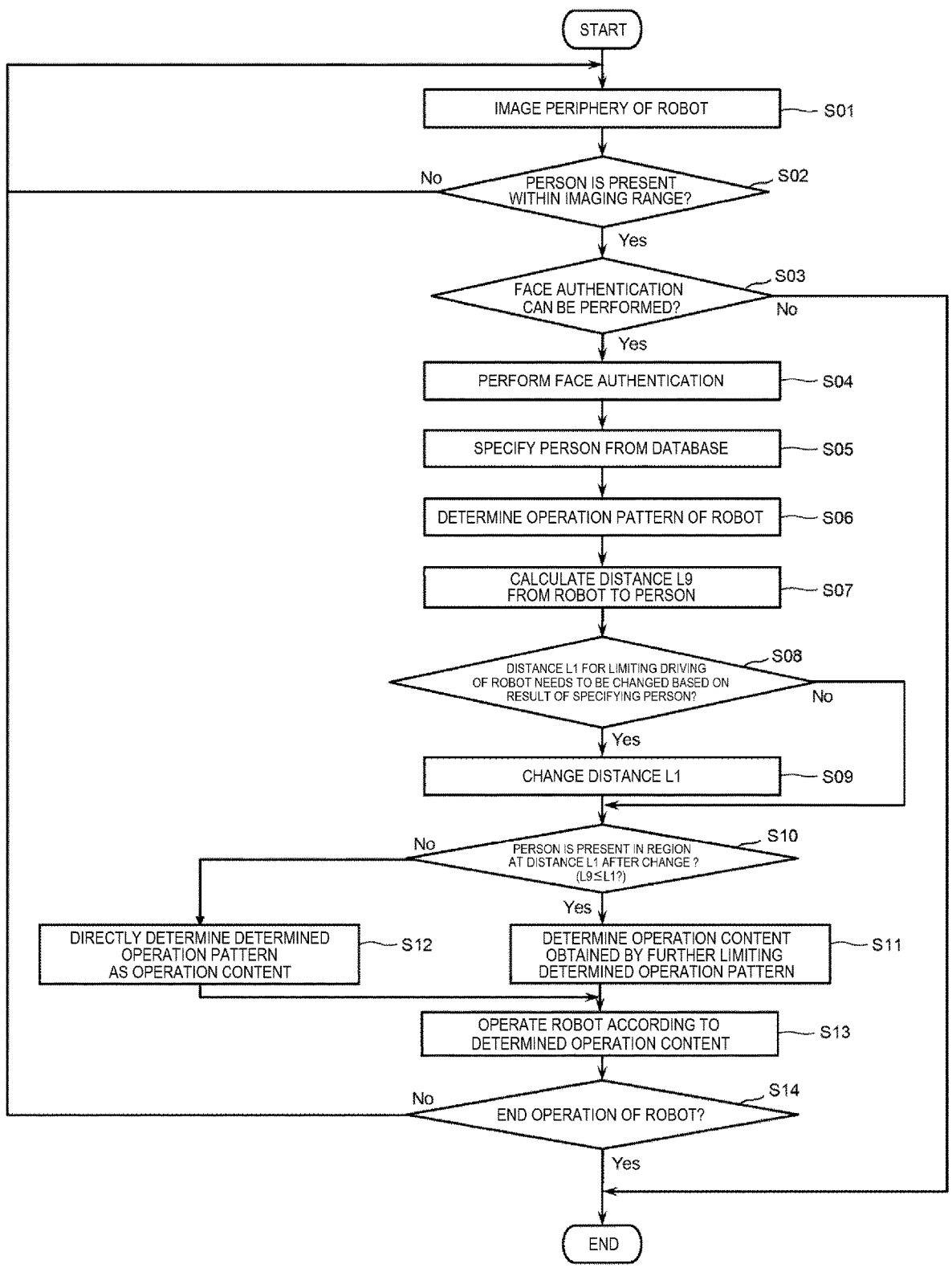
FIG. 5 is a flowchart showing a control method for a robot by a control device.
Figure 6:
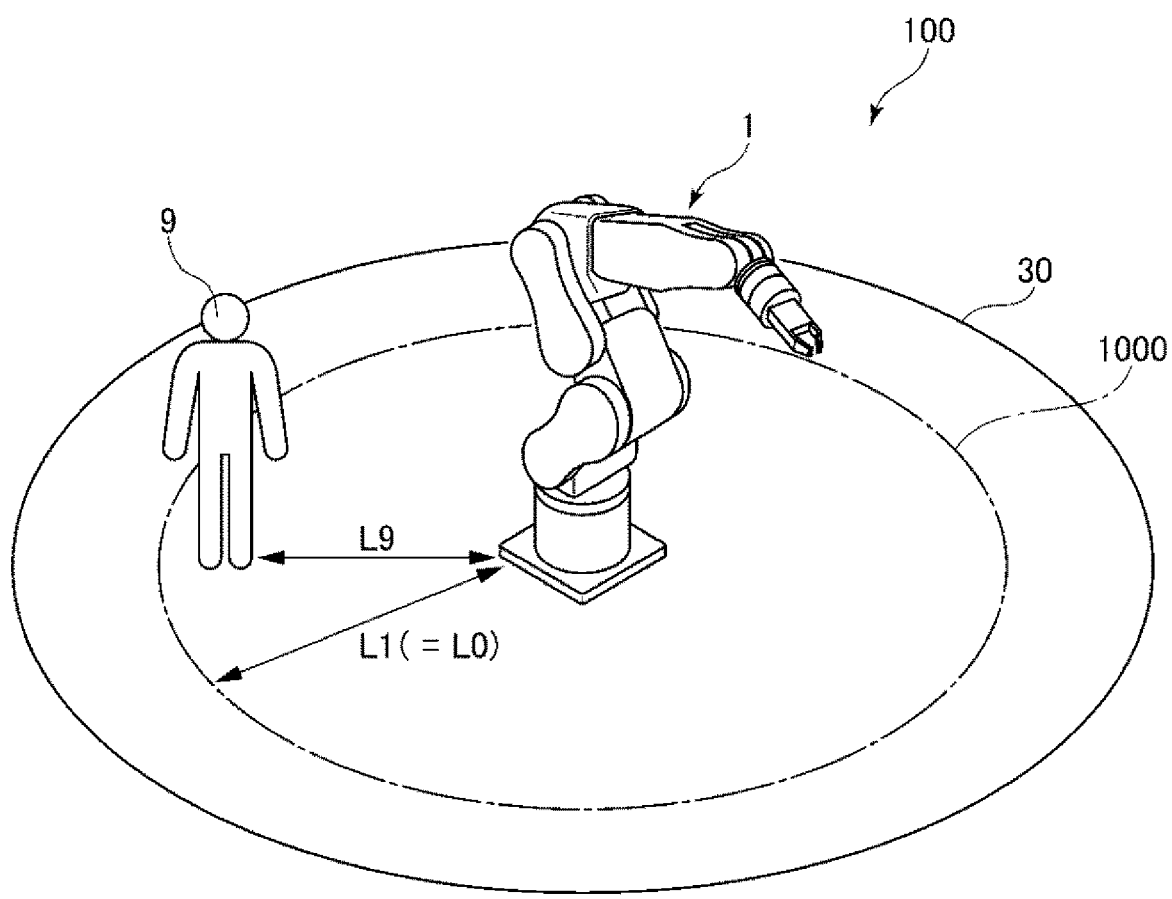
FIG. 6 is a diagram for explaining the control method for the robot shown in FIG. 5.
Figure 7:
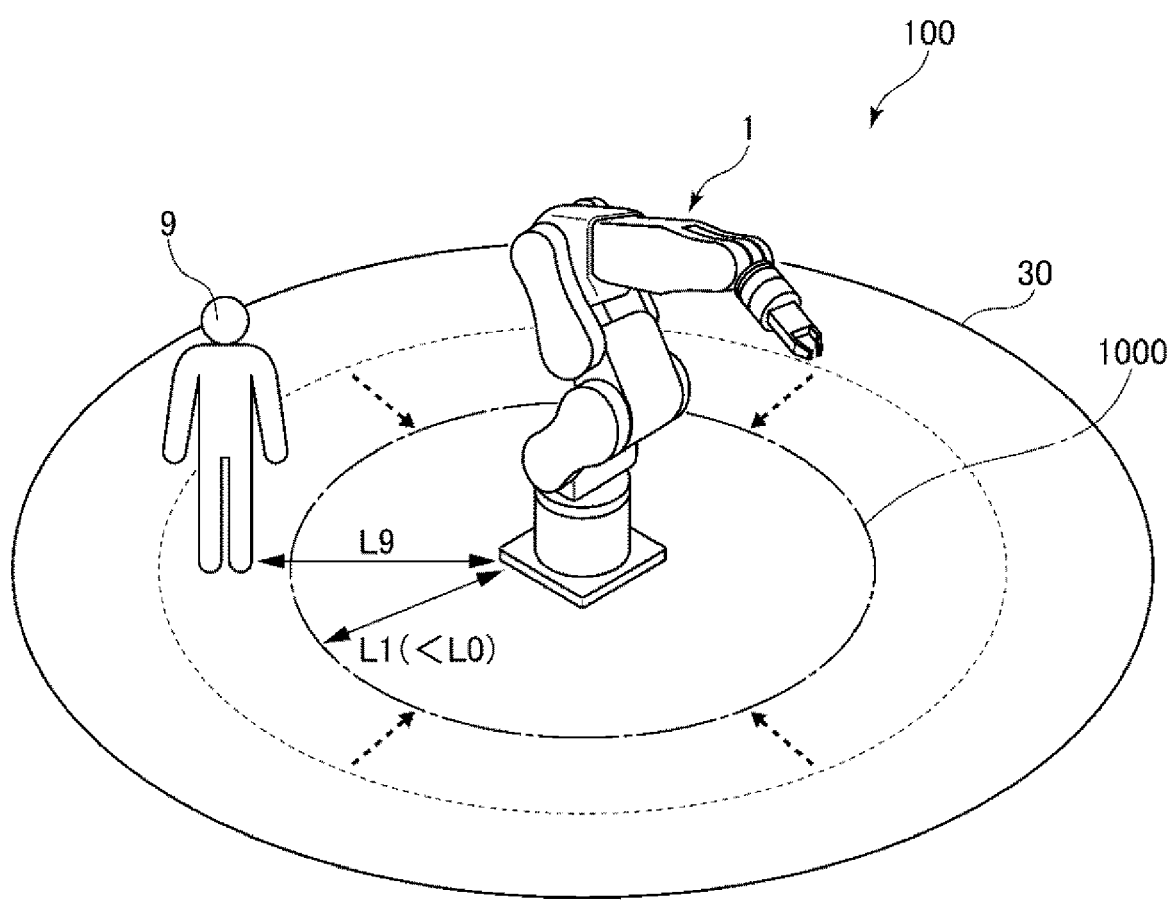
FIG. 7 is a diagram for explaining the control method for the robot shown in FIG. 5.

FIG. 5 is a flowchart showing a control method for the robot 1 by the control device 5. FIGS. 6 and 7 are respectively diagrams for explaining the control method for the robot 1 shown in FIG. 5.

First, in step S01 shown in FIG. 5, the control device 5 images, with the imaging section 3, an imaging range 30 set around the robot 1 shown in FIGS. 6 and 7. The imaging range 30 is determined by, for example, the optical system of the imaging section 3. The control device 5 outputs an acquired image to the specifying section 54.

In step S02 shown in FIG. 5, the control device 5 detects, with the specifying section 54, whether a person 9 is present in the imaging range 30 shown in FIGS. 6 and 7. At this stage, even if the person 9 is detected in the imaging range 30, the control device 5 does not need to collate the detected person 9 and personal information registered in a database of the registering section 55. The control device only has to detect at least an unspecified person 9. Therefore, for example, if a contour of an object is traced in the image acquired by the imaging section 3 and a traced shape is a human form, the person 9 can be regarded as being detected. When the presence of the person 9 in the imaging range 30 is detected, the control device 5 shifts to the next step S03. On the other hand, when the presence of the person 9 in the imaging range 30 is not detected, the control device 5 returns to step S01.

Subsequently, in step S03 shown in FIG. 5, the control device 5 determines, with the specifying section 54, based on the acquired image, whether face authentication can be performed. The face authentication means collating characteristics of a face in the acquired image with a face image registered in the database of the registering section 55.

Therefore, in this step, the control device 5 determines, based on, for example, image quality of the image, the size of the photographed person, and an angle of the face, whether it is possible to perform the face authentication. If it is possible to perform the face authentication, the control device 5 shifts to the next step S04. On the other hand, if the face authentication cannot be performed, the control device 5 ends the flow without starting the operation of the robot 1. The face authentication cannot be performed either, for example, when only a part other than the face such as a hand or a foot is photographed. According to such face authentication, it is guaranteed that only a person registered in the database can approach the robot 1 and perform cooperative work. As a result, it is possible to realize the robot system 100 with particularly high safety.

Subsequently, in step S04 shown in FIG. 5, the control device 5 performs the face authentication with the specifying section 54 based on the acquired image. In the face authentication, it is preferable to collate the face with the face image registered in the database of the registering section 55 and specify one individual. However, a plurality of candidates may be only listed.

Subsequently, in step S05 shown in FIG. 5, the control device 5 specifies an individual registered in the database from a result of the face authentication and other elements. If persons photographed in the acquired image are successfully narrowed down to one person as a result of the face authentication, the person is a person who should be specified in this step. When a plurality of candidates are listed as a result of the face authentication, the control device 5 may finally specify one person based on other elements, for example, secondary elements such as a specific pattern worn by the person in the image, a specific gesture performed by the person, and the height of the person.

When the person subjected to the face authentication is not registered in the database, the person only has to be treated as an unregistered person.

The face authentication is not always essential. An individual may be specified by only the other elements.

Subsequently, in step S06 shown in FIG. 5, first, the control device 5 determines, with the control section 51, an operation pattern of the robot 1 based on a result of specifying the person by the specifying section 54. The operation pattern means operation content permitted to a specified person. Operation content of the robot 1 is limited according to the distance from the robot 1 to the person 9 explained below. The operation pattern determined in this step is equivalent to the operation content before being limited according to the distance. Therefore, such an operation pattern is determined based on individual information of the specified person and only has to be stored in the database of the registering section 55 in advance.

Specific examples of the operation pattern include parameters such as driving speed of the robot 1 allowed when the specified person intrudes into a predetermined region 1000 explained below and a threshold of force for enabling driving to be continued when the specified person touches the robot 1. When the specified person is, for example, in a position of a responsible person for work performed using the robot 1, the specified person can increase the allowed driving speed of the robot 1 and increase the threshold of the force for enabling the driving to be continued. On the other hand, in the case of the unregistered person, the driving speed and the threshold only have to be set to minimum.

Subsequently, in step S07 shown in FIG. 5, as shown in FIGS. 6 to 7, the control device 5 calculates, with the control section 51, a distance L9 from the robot 1 to the person 9. The control device 5 extracts, for example, a positional relation between the floor and a foot of the person 9 on the image. The control device 5 can calculate the distance L9 from a separation distance between the robot 1 and the foot on the image.

Subsequently, in step S08 shown in FIG. 5, the control device 5 determines, with the control section 51, based on the result of specifying the person 9, whether it is necessary to change, from a standard distance L0, a distance L1 for limiting the driving of the robot 1. Specifically, as shown in FIGS. 6 and 7, a region for limiting the driving of the robot 1 when the person 9 intrudes into the region is represented as a region 1000 and the distance from the robot 1 to the outer edge of the region 1000 is represented as the distance L1. As explained above, the control section 51 according to this embodiment decelerates or stops the operation of the robot 1 when a person intrudes into the region 1000. Therefore, the distance L1 affects timing for limiting the driving of the robot 1 when the person 9 approaches the robot 1.

In this embodiment, the control device 5 determines, based on the result of specifying the person 9, with the control section 51, whether it is necessary to change the distance L1 from the standard distance L0. When it is necessary to change the distance L1, the control device 5 shifts to the next step S09. Step S09 is performed as explained in the following example.

Specifically, when the specified person 9 is, for example, an inexperienced person in work, the distance L1 is not changed. FIG. 6 shows an example in which the distance L1 is larger than the distance L9 from the robot 1 to the person 9. Consequently, since the person 9 is located on the inner side of the region 1000 in FIG. 6, the driving of the robot 1 is limited. As a result, even if a person having low proficiency in work like the inexperienced person in work excessively approaches the robot 1 and intrudes into the region 1000, it is possible to prevent the robot 1 from colliding with the person and reduce a shock.

On the other hand, when the specified person 9 is, for example, the person in the position like the responsible person explained above, the distance L1 only has to be reduced from the standard distance L0. FIG. 7 shows a state in which the distance L1 becomes smaller than the distance L1 shown in FIG. 6. As a result of such a change in the distance L1, in FIG. 7, the distance L1 after the change is smaller than the distance L9 from the robot 1 to the person 9. Consequently, since the region 1000 becomes narrower, as shown in FIG. 7, the person 9 is located outside the region 1000. Even in a state in which the person 9 approaches the robot 1, the driving of the robot 1 is not limited. Consequently, even in a state in which the person 9 in the position like the responsible person is present near the robot 1, it is possible to cause the robot 1 to efficiently perform work.

The distance L1 only has to be registered in, for example, the database of the registering section 55. The following table 1 is a table showing an example of the distance L1 and other data registered in the database of the registering section 55.

TABLE 1

| No. | Name | Distance L1 for limiting driving of the robot | Driving speed at the time when the person is present within the region of the distance L1 |
|---|---|---|---|
| 1 | A | 1000 mm | 70% |
| 2 | B | 1500 mm | 60% |

TABLE 1-continued

| No. | Name | Distance L1 for limiting driving of the robot | Driving speed at the time when the person is present within the region of the distance L1 |
|---|---|---|---|
| 3 | C | 2000 mm | 40% |
| ... | ... | ... | ... |

The driving speed in Table 1 is a ratio to maximum speed.

In Table 1, a person having a name A is an experienced operator and is equivalent to a person, for example, sufficiently educated. A person having a name B is a person inferior to the person having the name A in proficiency in work and is equivalent to a person, for example, educated but having less experience. Further, a person having a name C is a person inferior to the person having the name B in proficiency in work and is equivalent to a so-called inexperienced person, for example, not educated.

The person having the name A among the names A to C moves the smallest distance L1 and has the smallest decrease in driving speed even if the person intrudes into the region 1000. The person having the name C moves the largest distance L1 and has the largest decrease in driving speed when intruding into the region 1000. The person having the name B moves the intermediate distance L1 between the distance L1 of the person having the name A and the distance L1 of the person having the name C and has the intermediate decrease in driving speed when intruding into the region 1000 between the decrease in driving speed of the person having the name A and the decrease in driving speed of the person having the name C.

In step S08, the distance L1 set in the beginning may not be changed if it is unnecessary to change the distance L1. In that case, step S09 may be omitted. The control device 5 only has to shift to step S10. The distance L1 in step S08 in the first time only has to be set to the standard distance L0. The standard distance L0 is a distance that should be set for the unregistered person and only has to be set to a maximum distance, which can be substantially set, irrespective of a result of specifying the person 9.

After step S09, the control device 5 shifts to step S10. In step S10, the control device 5 determines whether the person 9 is present in the region 1000 at the distance L1 after the change. In other words, the control device 5 determines whether the distance L1 after the change is equal to or larger than the distance L9 from the robot 1 to the person 9. In the state shown in FIG. 6, that is, when the person 9 is present in the region 1000, the control device 5 shifts to step S11. On the other hand, in the state shown in FIG. 7, that is when the person 9 is absent in the region 1000, the control device 5 shifts to step S12.

Subsequently, in step S11 shown in FIG. 5, the control device 5 determines operation content obtained by further limiting the determined operation pattern. In other words, in step S11, since the person 9 is present in a position closer to the robot 1 than the distance L1 after the change, the control device 5 needs to further limit the driving of the robot 1.

On the other hand, in step S12 shown in FIG. 5, the control device 5 directly determines the determined operation pattern as operation content of the robot 1. In other words, in step S12, since the person 9 is present in a position farther from the robot 1 than the distance L1 after the change, the control device 5 does not need to further limit the driving of the robot 1.

Subsequently, in step S13 shown in FIG. 5, the control device 5 operate the robot 1 with the control section 51 according to the determined operation content.

Subsequently, in step S14 shown in FIG. 5, the control device 5 determines whether to end the operation of the robot 1. When ending the operation of the robot 1, the control device 5 ends the flow. On the other hand, when continuing the operation of the robot 1, the control device 5 returns the flow to step S01.

As explained above, the robot system 100 according to the first embodiment includes the robot 1 that operates in cooperation with a person, the specifying section 54 that specifies the person 9 present in the region 1000 at the predetermined distance L1 from the robot 1, and the control section 51 that decelerates or stops the operation of the robot 1 when the specifying section 54 specifies that the person 9 is present in the region 1000. The control section 51 is configured to change the distance L1 based on a result of specifying the person 9 by the specifying section 54.

Such a robot system 100 is configured to, when the person 9 approaches the robot 1, change, based on the result of specifying the person 9, the distance L1 for limiting the driving or the robot 1 rather than evenly limiting the driving of the robot 1. Accordingly, by reducing the distance L1, for example, when a person having high proficiency in work approaches the robot 1, the driving of the robot 1 is not limited even in a state in which the person having high proficiency approaches the robot 1. Consequently, it is possible to cause the robot 1 to efficiency perform work. In other words, according to this embodiment, when it is specified that the person 9 is present in the region 1000 at the predetermined distance from the robot 1, it is possible to realize the robot system 100 that less easily deteriorates productivity of work while performing control for decelerating or stopping the operation of the robot 1.

2. Second Embodiment

A robot system according to a second embodiment is explained.

Figure 8:
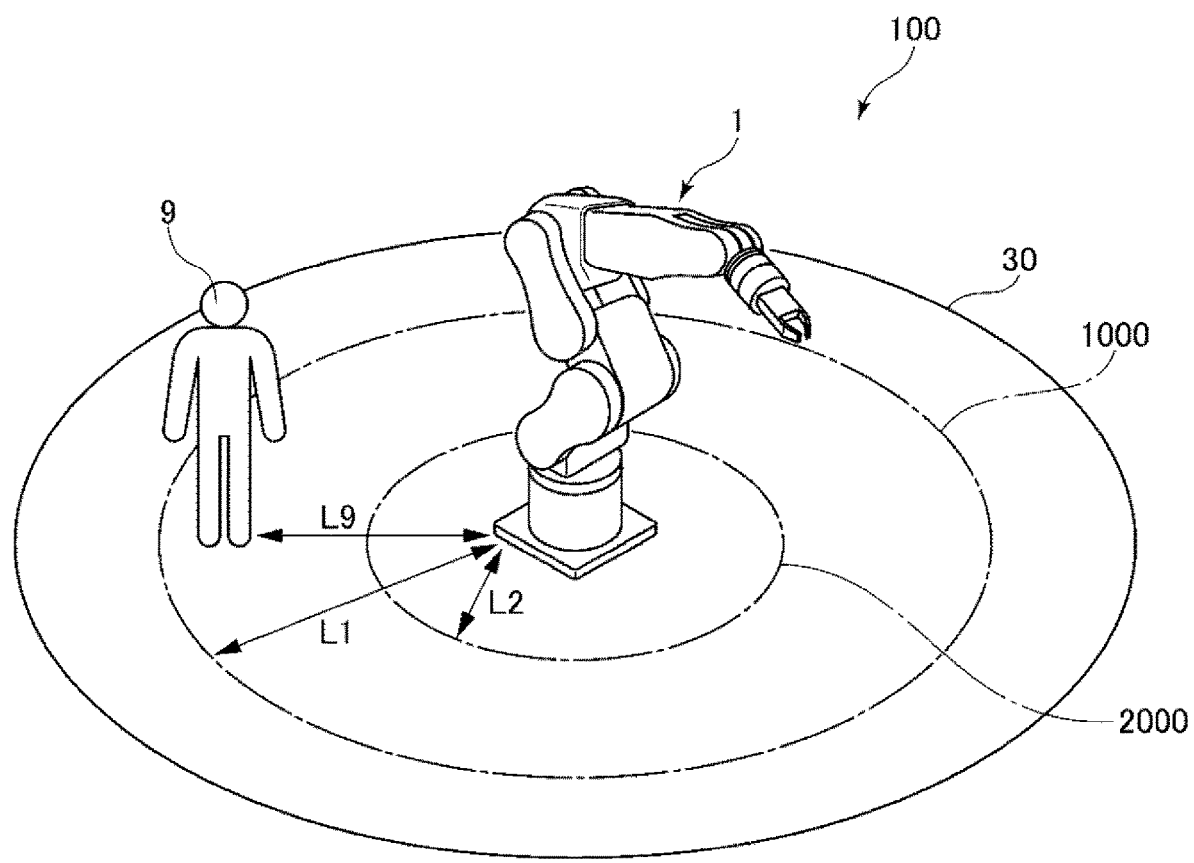
FIG. 8 is a schematic diagram of a robot system according to a second embodiment.

FIG. 8 is a schematic diagram of the robot system according to the second embodiment.

The second embodiment is explained below. In the following explanation, differences from the first embodiment are mainly explained. Explanation of similarities to the first embodiment is omitted. In FIG. 8, the same components as the components in the first embodiment are denoted by the same reference numerals and signs.

The second embodiment is the same as the first embodiment except that control by the control section 51 is different.

In the first embodiment explained above, the region 1000 is set around the robot 1. The driving of the robot 1 is limited when the person 9 intrudes into the region 1000. On the other hand, in this embodiment, the region 1000 for limiting the driving of the robot 1 is divided in two stages. In other words, another region 2000 is set on the inner side of the region 1000. The driving of the robot 1 is more strictly limited when the person 9 intrudes into the region 2000.

FIG. 8 shows an example in which the region 2000 for more strictly limiting the driving of the robot 1 is set on the inner side of the region 1000 shown in FIG. 6. When the distance from the robot 1 to the outer edge of the region 2000 is represented as a distance L2, the distance L2 is smaller than the distance L1. Parameters such as allowed driving speed of the robot 1 and a threshold of force for enabling driving to be continued when the person 9 touches the robot 1 are set to be stricter when the person 9 intrudes into the region 2000 compared with when the person 9 intrudes into the region 1000.

The distances L1 and L2 only have to be registered in, for example, the database of the registering section 55. The following Table 2 is a table showing an example of the distances L1 and L2 and other data registered in the database of the registering section 55.

TABLE 2

| No. | Name | Distance L1 for limiting driving of the robot | Distance L2 for enabling the person to touch the robot and perform work | Driving speed at the time when the person is present in the region at the distance L1 | Driving speed at the time when the person is present in the region at the distance L2 | Allowable load during contact |
|---|---|---|---|---|---|---|
| 1 | A | 1000 mm | 500 mm | 70% | 30% | 25N |
| 2 | B | 1500 mm | 700 mm | 60% | 20% | 15N |
| 3 | C | 2000 mm | 1000 mm | 40% | 0% (stopped) | 10N |
| ... | ... | ... | ... | ... | ... | ... |

The description of Table 2 follows the description of Table 1 described above.

The person having the name A among the names A to C moves the smallest distance L2 and has the smallest decrease in driving speed even if the person intrudes into the region 2000. The person having the name C moves the largest distance L2 and the robot 1 is stopped when the person having the name C intrudes into the region 2000. The person having the name B moves the intermediate distance L2 between the distance L2 of the person having the name A and the distance L2 of the person having the name C and has the intermediate decrease in driving speed when intruding into the region 2000 between the decrease in driving speed of the person having the name A and the decrease in driving speed of the person having the name C.

By setting such a region 2000, for example, the person 9 can easily perform so-called direct teach, that is, work for directly touching the robot arm 10 of the robot 1 and teaches the operation of the robot 1. In the direct teach, the person 9 is requested to perform work for holding the robot arm 10 and guiding the robot arm 10 to a target direction. Accordingly, the person 9 needs to be allowed to be located near the robot 1 and apply force to the robot 1. In other words, the distance L2 is the shortest distance of the foot of the person 9 for enabling the person 9 to touch the robot 1 and perform work, that is, the shortest distance between the base 110 and the foot of the person 9. The definitions of the distances L1 and L2 are not limited to the above description.

From such a point of view, the control section 51 according to this embodiment sets the region 2000 and controls the robot 1 such that the driving of the robot 1 continues even at low speed even if the person 9 intrudes into the region 2000. The control section 51 controls the robot 1 to allow a load up to a load having predetermined magnitude even when the force sensor 120 detects force acting on the robot 1. By performing such control, it is possible to efficiently perform the direct teach. Therefore, it is possible to realize the robot system 100 having higher productivity of work.

In other words, the robot system 100 according to this embodiment includes the force sensor 120 that detects force acting on the robot 1. The control section 51 limits the driving of the robot 1 to decelerate or stop the operation of the robot 1 when the force detected by the force sensor 120 is equal to or larger than a predetermined value, that is, the allowable load shown in Table 2.

Consequently, it is possible to secure safety even when work such as the direct teach is performed.

The control section 51 may have a function of changing, based on the result of specifying the person 9 by the specifying section 54, the threshold of the force for limiting the driving of the robot 1 like the predetermined value, that is, the allowed load shown in Table 2. By having such a function, the control section 51 can relax a condition for limiting the driving of the robot 1 when a person having high proficiency in work like, for example, the person having the name A shown in Table 2 perform the work. Consequently, it is possible to further improve efficiency of the work while securing safety of the robot 1.

In the second embodiment explained above, the same effects as the effects in the first embodiment are obtained.

3. Third Embodiment

A robot system according to a third embodiment is explained.

FIGS. 9 to 13 are respectively schematic diagrams of the robot system according to the third embodiment.

The third embodiment is explained below. In the following explanation, differences from the first embodiment are mainly explained. Explanation of similarities to the first embodiment is omitted. In FIGS. 9 to 13, the same components as the components in the first embodiment are denoted by the same reference numerals and signs.

The third embodiment is the same as the first embodiment except that the control by the control section 51 is different.

Figure 9:
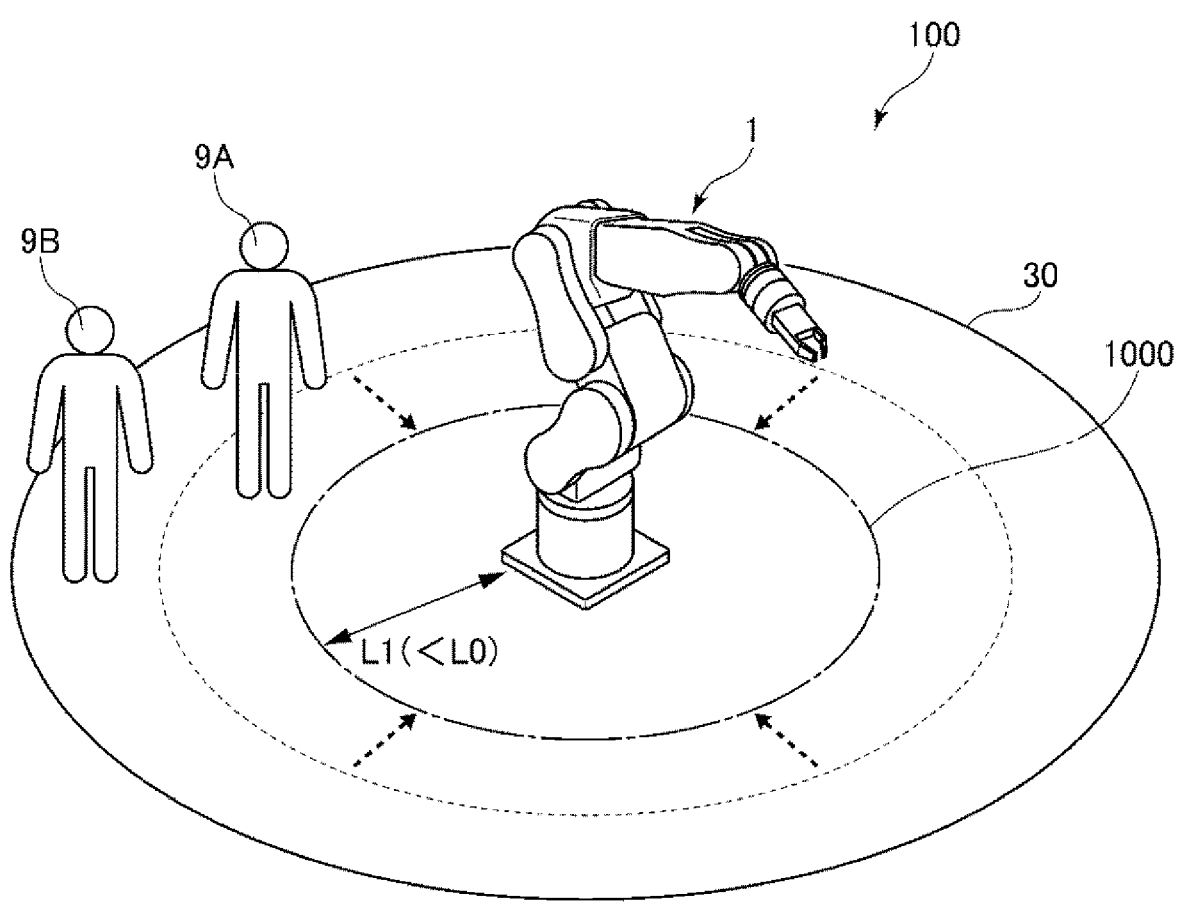
FIG. 9 is a schematic diagram of a robot system according to a third embodiment.
Figure 10:
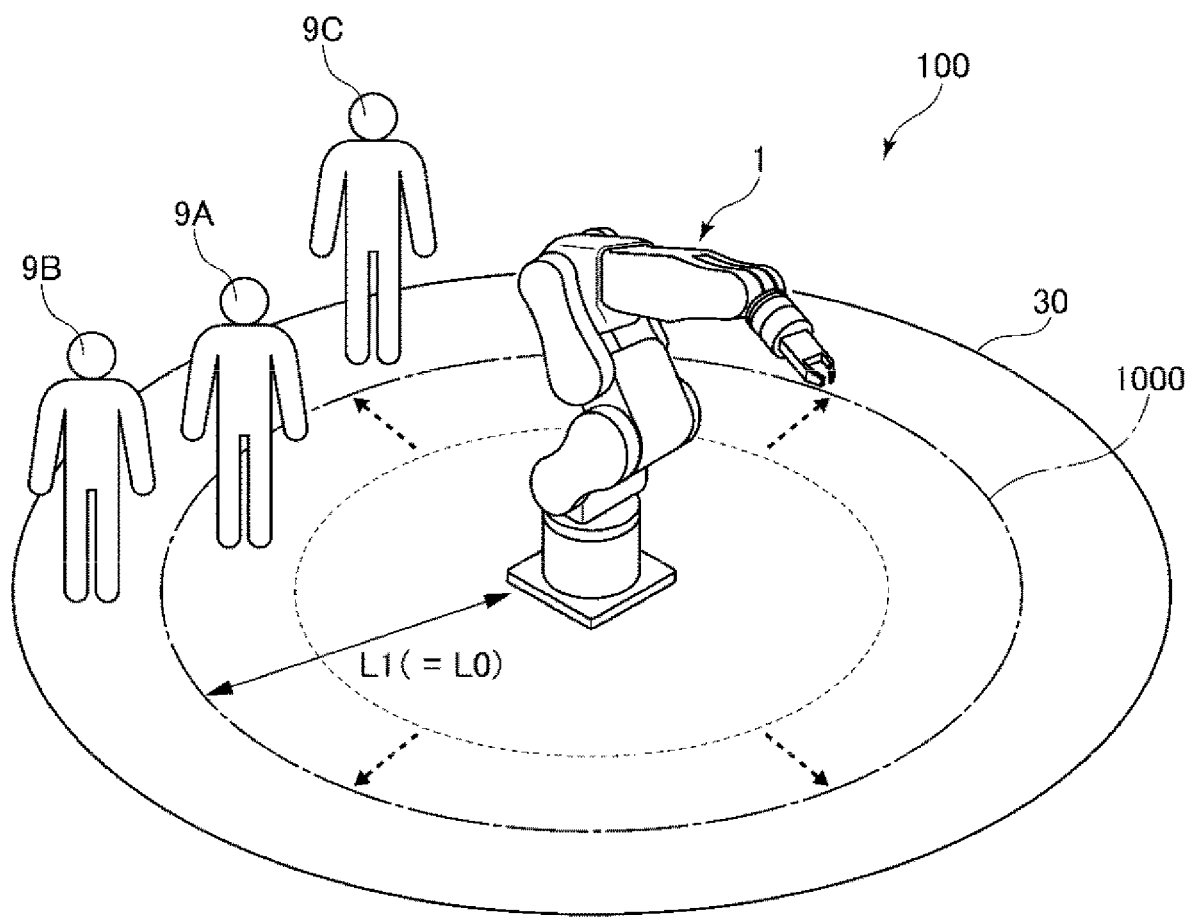
FIG. 10 is a schematic diagram of the robot system according to the third embodiment.

FIG. 9 shows an example in which two persons 9A and 9B are present on the inner side of the imaging range 30. On the other hand, FIG. 10 shows an example in which three persons 9A, 9B, and 9C are present on the inner side of the imaging range 30. All of the persons 9A, 9B, and 9C shown in FIGS. 9 and 10 are specified by the specifying section 54. For convenience of explanation, it is assumed that the persons 9A, 9B, and 9C have attributes corresponding to the names A, B, C shown in Table 2, that is, personal information of the persons 9A, 9B, and 9C is registered in the database of the registering section 55. In other words, the person 9A is the person having the name A in Table 2, the person 9B is the person having the name B in Table 2, and the person 9C is the person having the name C in Table 2.

When such a plurality of persons are present around the robot 1, the robot 1 and the persons more easily come into contact with each other. Therefore, the control section 51 may be configured to, when the driving of the robot 1 is limited by the control section 51, change the distance L1 based on the number of persons specified by the specifying section 54.

Specifically, when a situation in which two persons are present in the imaging range 30 as shown in FIG. 9 and a situation in which three persons are present in the imaging range 30 as shown in FIG. 10 are compared, a probability of occurrence of contact of the robot 1 and the persons is considered to be higher in the situation shown in FIG. 10. Therefore, in FIG. 10, the distance L1 is set to be longer compared with FIG. 9. Consequently, it is possible to secure safety even when a plurality of persons are present around the robot 1.

Figure 11:
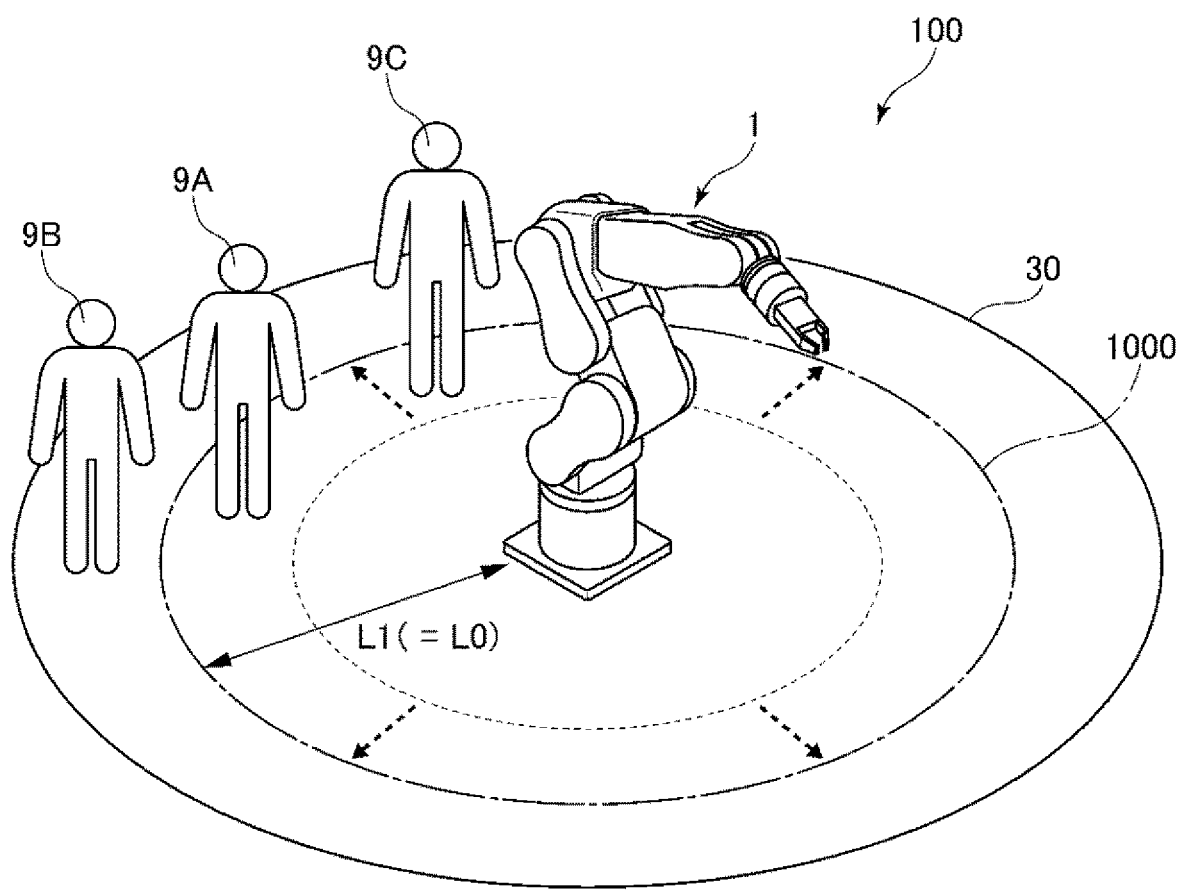
FIG. 11 is a schematic diagram of the robot system according to the third embodiment.

FIG. 11 is a diagram showing a state in which the person 9C is added to the inner side of the region 1000 shown in FIG. 9.

In such a situation, the control section 51 may be configured to, when the robot system 100 includes the registering section 55 in which personal information of persons is registered and sets the persons registered in the registering section 55 as registration target persons, change the distance L1 based on the number of registration target persons specified as being present in the region 1000 by the specifying section 54.

Specifically, whereas no person is present in the region 1000 in FIG. 9, the person 9C is added to the same position as the position of the person 9A. In such a situation, the number of registration target persons increases, although the registration target persons are present on the outer side of the region 1000 shown in FIG. 9. Therefore, in terms of a probability, contact of the robot 1 and the persons is considered to easily occur. Therefore, in FIG. 11, the distance L1 is set to be longer compared with FIG. 9. Consequently, it is possible to further secure safety even when a plurality of persons are present around the robot 1.

The following Table 3 is an example of data registered in the database of the registering section 55 when it is assumed that presence of a plurality of persons in the imaging range 30 is specified. An example of the distances L1 and L2 and other data is shown in Table 3.

The description of Table 3 follows the description of Table 1 described above. As shown in Table 3, when a plurality of persons are registered, it is preferable to also consider that the plurality of persons are simultaneously specified. In that case, content of limitation of driving may be differentiated between the first person and the second person.

Table 4 described below is an example of data registered in the database of the registering section 55 when it is assumed that presence of a plurality of persons in the imaging range 30 is specified and a person who is a responsible person for work and a person who is not the responsible person are included in the specified persons. An example of the distances L1 and L2 and other data is shown in Table 4.

TABLE 4

| Responsible person | No. | Name | Distance L1 for limiting driving of the robot | Distance L2 for enabling the person to touch the robot and perform work | Driving speed at the time when the person is present in the region at the distance L1 | Driving speed at the time when the person is present in the region at the distance L2 | Allowable load during contact |
|---|---|---|---|---|---|---|---|
| Present | 1 | A | 1000 mm | 500 mm | 70% | 30% | 15N |
|  | 2 | B | 1500 mm | 700 mm | 60% | 20% | 10N |
|  | 3 | C | 2000 mm | 1000 mm | 40% | 0% (stopped) | 0N |
|  | ... | ... | ... | ... | ... | ... | ... |
| Absent | 1 | A | 1200 mm | 700 mm | 60% | 20% | 5N |
|  | 2 | B | 1700 mm | 1000 mm | 50% | 0% (Stopped) | 0N |
|  | 3 | C | 2200 mm | 1500 mm | 30% | 0% (stopped) | 0N |
|  | ... | ... | ... | ... | ... | ... | ... |

The description of Table 4 follows the description of Table 1 described above. As shown in Table 4, content of limitation of driving may be differentiated according to presence or absence of the responsible person.

Figure 12:
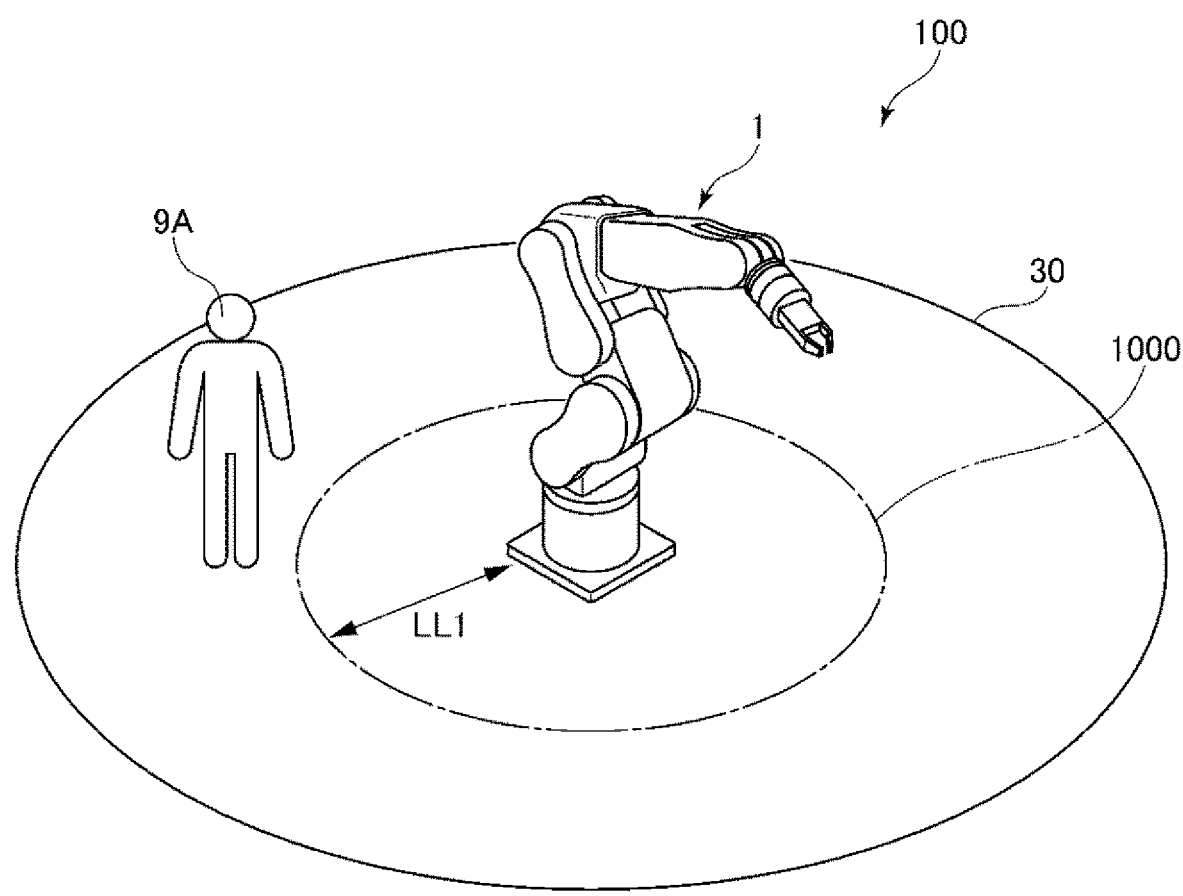
FIG. 12 is a schematic diagram of the robot system according to the third embodiment.
Figure 13:
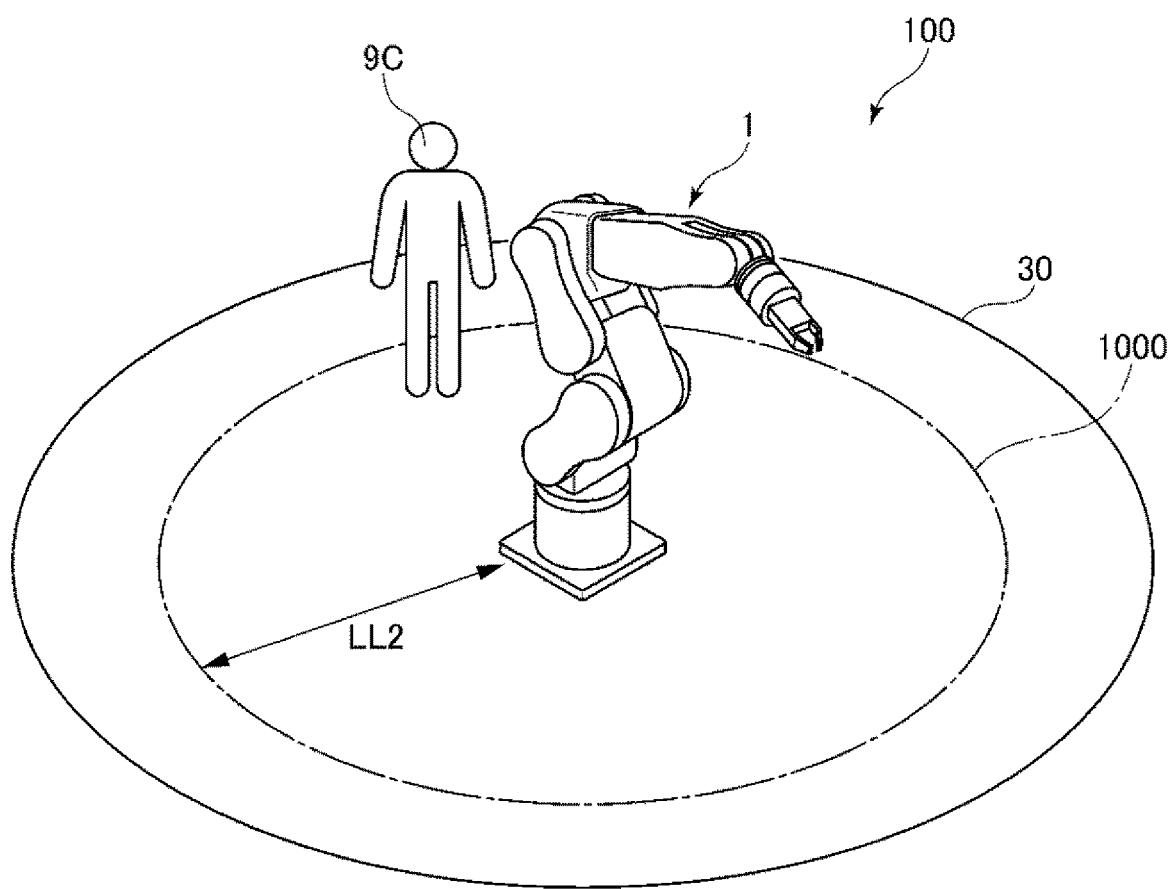
FIG. 13 is a schematic diagram of the robot system according to the third embodiment.

FIGS. 12 and 13 respectively show examples in which persons having different proficiencies in work are present on the inner side of the imaging range 30.

In FIG. 12, the person 9A is present on the inner side of the imaging range 30. On the other hand, in FIG. 13, the person 9C is present on the inner side of the imaging range 30. The robot system 100 shown in FIGS. 12 and 13 includes the registering section 55 in which personal information of the person 9A (a first person), whose proficiency in work is first proficiency, and personal information of the person 9C (a second person), whose proficiency in work is second proficiency lower than the first proficiency, are respectively registered.

TABLE 3

| Number of persons | No. | Name | Distance L1 for limiting driving of the robot | Distance L2 for enabling the person to touch the robot and perform work | Driving speed at the time when the person is present in the region at the distance L1 | Driving speed at the time when the person is present in the region at the distance L2 | Allowable load during contact |
|---|---|---|---|---|---|---|---|
| First person | 1 | A | 1000 mm | 500 mm | 70% | 30% | 15N |
|  | 2 | B | 1500 mm | 700 mm | 60% | 20% | 10N |
|  | 3 | C | 2000 mm | 1000 mm | 40% | 0% (stopped) | 0N |
|  | ... | ... | ... | ... | ... | ... | ... |
| Second person | 1 | A | 1200 mm | 700 mm | 60% | 20% | 5N |
|  | 2 | B | 1700 mm | 1000 mm | 50% | 0% (Stopped) | 0N |
|  | 3 | C | 2200 mm | 1500 mm | 30% | 0% (stopped) | 0N |
|  | ... | ... | ... | ... | ... | ... | ... |

The control section 51 sets the distance from the robot 1 to the outer edge of the region 1000 to a first distance LL1 when the specifying section 54 specifies the presence of the person 9A based on the information registered in the registering section 55. On the other hand, the control section 51 sets the distance from the robot 1 to the outer edge of the region 1000 to a second distance LL2 longer than the first distance LL1 when the specifying section 54 specifies the presence of the person 9C based on the information registered in the registering section 55.

By performing such control, the driving of the robot 1 is less easily limited even in a state in which the person 9A having relatively high proficiency in work approaches the robot 1. Consequently, it is possible to cause the robot 1 to efficiently perform work even in a state in which the person 9A is present near the person 9A.

When it is specified that both of the person 9A (the first person), whose proficiency in work is the first proficiency, and the person 9C (the second person), whose proficiency in work is the second proficiency, are present as shown in FIG. 11, the control section 51 preferably sets the distance from the robot 1 to the outer edge of the region 1000 to the second distance LL2. In other words, when the persons 9A and 9C having different proficiencies each other are simultaneously present on the inner side of the imaging range 30, it is preferable to set the distance from the robot 1 to the outer edge of the region 1000 according to the person 9C having low proficiency.

Consequently, it is possible to realize the robot system 100 having high safety for both of the persons 9A and 9C.

4. Fourth Embodiment

A robot system according to a fourth embodiment is explained.

Figure 14:
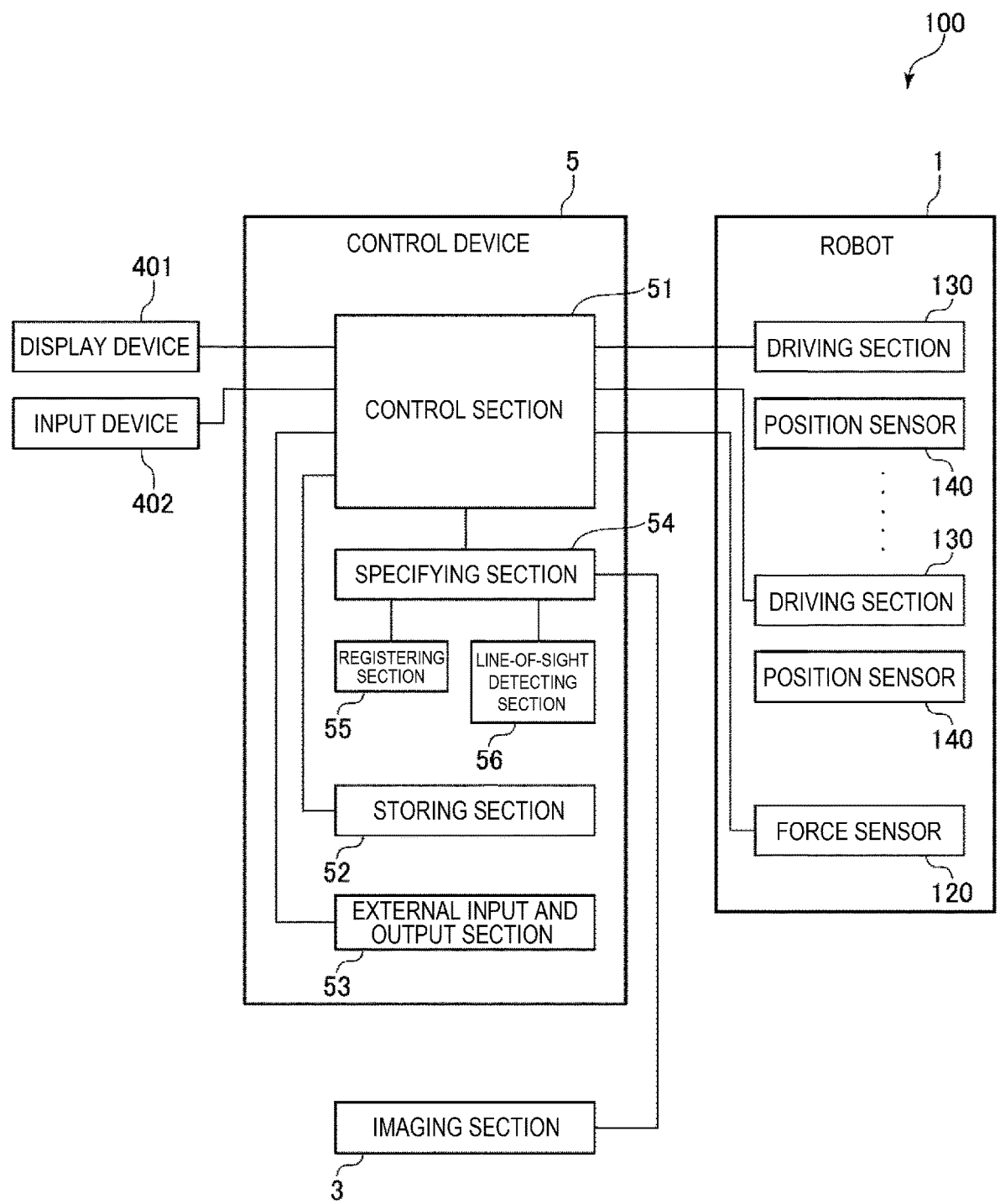
FIG. 14 is a functional block diagram of a robot system according to a fourth embodiment.

FIG. 14 is a functional block diagram of the robot system according to the fourth embodiment.

The fourth embodiment is explained below. In the following explanation, differences from the first embodiment are mainly explained. Explanation of similarities to the first embodiment is omitted. In FIG. 14, the same components as the components in the first embodiment are denoted by the same reference numerals and signs.

The fourth embodiment is the same as the first embodiment except that the configuration of the control device 5 is different.

The control device 5 shown in FIG. 14 includes a line-of-sight detecting section 56 coupled to the specifying section 54. The line-of-sight detecting section 56 has a function of detecting a direction of a line of sight of a person in an image captured by the imaging section 3. The line-of-sight detecting section 56 outputs information concerning the detected line of sight to the control section 51 via the specifying section 54.

The control section 51 changes the distance L1 from the robot 1 to the outer edge of the region 1000 based on the direction of the line of sight of the person detected by the line-of-sight detecting section 56. Such control is performed because the direction of the line of sight of the person matches a direction in which the person is paying attention. In other words, when the line of sight is in the direction of the robot 1, the person is paying attention to the robot 1. When the line of sight is not in the direction of the robot 1, the person is not paying attention to the robot 1. When the line of sight is in the direction of the robot 1, it is easy to avoid contact of the robot 1 and the person even if the distance L1 from the robot 1 to the outer edge of the region 1000 is reduced. Consequently, the person whose line of sight is in the direction of the robot 1 is allowed to perform work in a position closer to the robot 1. Therefore, it is possible to improve efficiency of the work. As a result, it is possible to improve productivity while securing safety of the robot 1.

A publicly-known line-of-sight detection technique can be used for the line-of-sight detection. Specifically, it is possible to find a reference point, which is a portion where a human eye does not move, and a moving point, where the human eye moves, in the image captured by the imaging section 3 and detect the line of sight based on the position of the moving point with respect to the reference point. For example, an inner corner of an eye, a cornea, or the like can be used as the reference point. An iris, a pupil, or the like can be used as the moving point.

The robot systems according to the embodiments of the present disclosure are explained above. However, the present disclosure is not limited to the embodiments. The components of the sections can be replaced with any components having the same functions. Any other components may be respectively added to the robot systems according to the embodiments.

What is claimed is:

1. A robot system comprising:
   a robot configured to operate in cooperation with a person;
   an image sensor configured to capture an imaging range around the robot to generate a captured image;
   a memory configured to store a program and a database including face images and proficiency in work of a plurality of persons; and
   a processor configured to execute the program so as to:
      receive the captured image from the image sensor;
      detect whether the person is within the imaging range based on the captured image;
      perform face authentication by comparing the face images in the database and the captured image when the processor detects that the person is within the imaging range;
      identify the person based on a result of the face authentication;
      calculate a robot-person distance between the robot and the person within the imaging range based on the captured image;
      determine whether a predetermined distance for limiting driving operation of the robot is the be changed to another distance based on the corresponding proficiency in work of the identified person;
      decelerate or stop the driving operation of the robot when the robot-person distance is within the predetermined distance and the processor determines that the predetermined distance for limiting the driving operation of the robot is not to be changed to the another distance; and
      decelerate or stop the driving operation of the robot when the robot-person distance is within the another distance and the processor determines that the predetermined distance for limiting the driving operation of the robot is to be changed to the another distance.

2. The robot system according to claim 1,
   wherein the processor is further configured to determine whether the predetermined distance for limiting the driving operation of the robot is to be changed based on a number of persons in the captured image.

3. The robot system according to claim 1,
wherein the plurality of persons include a first person and a second person the proficiency in work of the first person is higher than the proficiency in work of the second person,
when person the identified person is first person, the processor changes the predetermined distance to the another distance, and
when the identified person is the second person, the processor does not change the predetermined distance that is longer than the another distance.

4. The robot system according to claim 3,
wherein, when the processor determines that the first person and the second person are within the imaging range, the processor does not change the distance.

5. The robot system according to claim 1, further comprising a force sensor configured to detect force acting on the robot, wherein
when the force detected by the force sensor is equal to or larger than a predetermined value, the processor is configured to decelerate or stop the driving operation of the robot.

6. The robot system according to claim 5,
wherein the processor is configured to change the predetermined value based on the corresponding proficiency in work of the identified person.

7. The robot system according to claim 1,
wherein the processor is further configured to detect a line-of-sight of the identified person,
the processor determines whether the predetermined distance for limiting the driving operation of the robot is to be changed to the another distance based on a direction of the detected line-of-sight of the identified person.

* * * * *